United States Patent [19]

Allen

[11] Patent Number: 5,703,833
[45] Date of Patent: *Dec. 30, 1997

[54] ONE STEP INVERSION/SEPARATION SCHEME USING A PLURALITY OF VIBRATOR SOURCES

[75] Inventor: Kenneth Paul Allen, Dallas, Tex.

[73] Assignee: Mobil Oil Corporation, Fairfax, Va.

[*] Notice: The term of this patent shall not extend beyond the expiration date of Pat. No. 5,550,786.

[21] Appl. No.: 555,655

[22] Filed: Nov. 13, 1995

[51] Int. Cl.$^6$ ................ G01V 1/36; G01V 1/28
[52] U.S. Cl. .............. 367/46; 67/21; 67/49; 67/189; 364/421
[58] Field of Search ............ 367/21, 46, 49, 367/189; 364/421; 382/42; 181/111

[56] References Cited

U.S. PATENT DOCUMENTS

| | | | |
|---|---|---|---|
| 4,184,144 | 1/1980 | Rickenbacker | 367/137 |
| 4,348,749 | 9/1982 | Galbraith | 367/46 |
| 4,545,039 | 10/1985 | Savit | 367/39 |
| 4,646,274 | 2/1987 | Martinez | 367/41 |
| 4,675,851 | 6/1987 | Savit et al. | 367/41 |
| 4,707,812 | 11/1987 | Martinez | 367/46 |
| 4,715,020 | 12/1987 | Landrum, Jr. | 367/38 |
| 5,010,526 | 4/1991 | Linville et al. | 367/46 |
| 5,173,879 | 12/1992 | Cung et al. | 367/46 |
| 5,400,299 | 3/1995 | Trantham | 367/38 |
| 5,550,786 | 8/1996 | Allen | 367/48 |

OTHER PUBLICATIONS

Newman, B. J.; 58th Annu. Soc. Explor. Geophys. Int. Mtg., pp. 88–91, Oct. 30, 1988; Abst. Only Herewith.

*Primary Examiner*—Nelson Moskowitz
*Attorney, Agent, or Firm*—Malcolm D. Keen

[57] ABSTRACT

A method for generating, recording and pre-processing high fidelity vibratory seismic data in a system that uses a plurality of vibratory sources includes the steps of measuring the motion of each of the vibrators, determining a ratio by dividing the vibratory seismic data by the measured motion of the vibrator to remove the unknown applied force leaving the earth reflectivity times a time derivative divided by a minimum phase function, minimum phase band pass filtering the resulting ratio and performing minimum phase deconvolution to remove the time derivative divided by the transfer function of minimum phase. The method may also include the steps of shot ensemble deconvolution, receiver ensemble deconvolution, statics correction, F-K filtering for noise, zero phase spiking deconvolution and model dephasing. A signal directly proportional to the actual signal that the vibrator is sending into the ground is used in pre-processing. The vibrator motion is measured to provide a signal that is used to process the data. The data is divided by the relative of the actual transmitted signal in frequency domain.

14 Claims, 2 Drawing Sheets

ONE STEP INVERSION/SEPARATION SCHEME USING A PLURALITY OF VIBRATOR SOURCES

BACKGROUND OF THE INVENTION

1. Field of the Invention

The present invention pertains to seismic data processing and more particularly to pre-processing seismic data in which data generated by multiple vibrating sources is received and processed using high resolution or high fidelity data processing.

2. Related Prior Art

It is conventional practice to use vibratory sources to apply a force to the ground and measure the subsequent motion caused by the application of this force at various receiver locations. By controlling the duration and frequency of the force, a broad band signal with sufficient energy is achieved. By using the receiver motions and assumed force application a seismogram is constructed. This is usually done by correlation of the received data with an estimate of the applied force, from which properties of the impedance function of the earth can be calculated.

In the interest of economy, several sources are used at the same time. In order to construct a seismogram, a determination of which source was responsible for the detected motions of the receivers must be made. Each source has unique characteristics that aids in isolating the source that generated the force which caused the receiver motions, since the data received will vary for each source. Processing with the estimate of one source on data generated by another source will produce an inaccurate seismogram.

The main deficiency of conventional practice is that an estimate of the actual applied force is used to create the seismogram. Much work has been done on order to improve the quality of feedback signals and the operation of feedback loops and hydraulic valves. However, harmonics, device flexure and variable ground coupling remain as unknowns in the system and cannot be removed completely.

In gathering seismic data using ground vibrations, a large mass is placed in contact with the ground. Simple vibrators may be used in the present invention. Typically, the reaction mass motion is measured by an accelerometer mounted on the reaction mass itself. The motion of a baseplate, which is actually coupled to the ground, is measured by an accelerometer mounted on the stilt structure cross member.

In conventional processing, data that is generated by a vibratory source is correlated with a reference sweep. A reference sweep signal is an ideal signal which the vibrator is told to put into the ground, which is often quite different from the actual signal which is generated. Since the reference signal is a fictitious ideal signal, it is the same for all vibrators.

In some instances the signal representing the applied force is estimated. The typical estimate for the applied force is the mass weighted sum of the acceleration of the baseplate used in the vibrating source and the acceleration of the reaction mass used in the vibrator structure, called the ground force.

The mass weighted sum of the two signals, one from the baseplate and one from its reaction mass, is used in a feedback loop to tell the actuator how close it is to the reference sweep. With this system it is assumed that the force injected into the ground is the same as the reference sweep. However, as stated previously, the actual signal is often very different from the reference sweep signal.

The force put into the ground can be viewed either in the time domain or in the frequency domain. Similarly, the impulse response of the earth can be viewed either in the time domain or the frequency domain. The time derivative of the force put into the ground is convolved with the impulse response of the earth in the time domain while the time derivative of the force is multiplied by the impulse response of the earth in the frequency domain. In its most basic form, a signal that represents the derivative of the ground force convolved with the impulse response of the earth is detected by geophones or receivers located on the surface of the earth. This signal is detected after it has been reflected by an interface existing between two subsurface layers having different impedances. The detected signal is correlated with the reference sweep signal fed to the actuator. This correlation works fine as long as the force put into the ground is the same as the reference sweep signal. Since it is rarely the same, an accurate estimate of the impulse response of the earth is seldom achieved.

Correlation in the frequency domain requires that the data be multiplied by the time reverse of the signal with which the correlation is being done. Since the reference signal is only an estimate of the actual ground force, correlation with a reference signal produces a result with an unknown still in the data. In the case of correlation of the detected signal with the reference signal, as long as the amplitude and phase errors of the reference signal are small the damage of the unknown to the result is lessened, but it still adds error.

SUMMARY OF THE INVENTION

The present invention provides a method for recording and processing high resolution vibratory source data which includes measuring the motion or motions of the vibrators which are related to the actual vibrator applied force by a transfer function of a minimum phase, causal, linear system. Signals representing these motions are used in an inversion operation to process the received data. This system relates the actual vibrator output with the measured vibrator motion or motions. The vibrators are energized with a predetermined pattern. A ratio is determined by dividing the vibratory seismic data by the measured motion or motions of the vibrators to remove the unknown applied force. The result of this division leaves the earth reflectivity times a time derivative divided by a minimum phase function. Minimum phase deconvolution is performed to remove the time derivative divided by the transfer function of minimum phase. The method may also include the steps of shot ensemble deconvolution, receiver ensemble deconvolution, statics correction, F-K filtering for noise, receiver deconvolution, zero phase spiking deconvolution and model dephasing as further processing of the received data.

DESCRIPTION OF THE PREFERRED EMBODIMENT

In the present invention, a signal directly related to the actual signal that the vibrator is sending into the ground is used in pre-processing.

In practicing the present invention, simple vibrators may be used. These ground vibrators usually have a large mass is placed in contact with the ground. In practicing the present invention, the reaction mass motion is measured by a pair of accelerometers mounted on the reaction mass itself. The motion of a baseplate, which is actually coupled to the ground, is measured by a second pair of accelerometers mounted on the stilt structure cross member.

In practicing the present invention, pairs of accelerometers are used so that the outputs may be compared and whether the signal generated is suitable for use in further processing may be determined. The vibrator motion or motions are measured to provide a signal that is used to process the data. Thus, the data is not correlated with a theoretical sweep signal but the data is divided by a minimum phase relative of the actual transmitted signal in the frequency domain, which removes the actual transmitted signal from the determination. When solving for the earth reflectivity, data is basically divided by the vibrator ground force multiplied by a transfer function of minimum phase, removing the vibrator force from the data. This leaves the earth reflectivity multiplied by a time derivative over a minimum phase transfer function. This ratio of a time derivative divided by a minimum phase transfer function is removed by minimum phase deconvolution.

Figure 1:
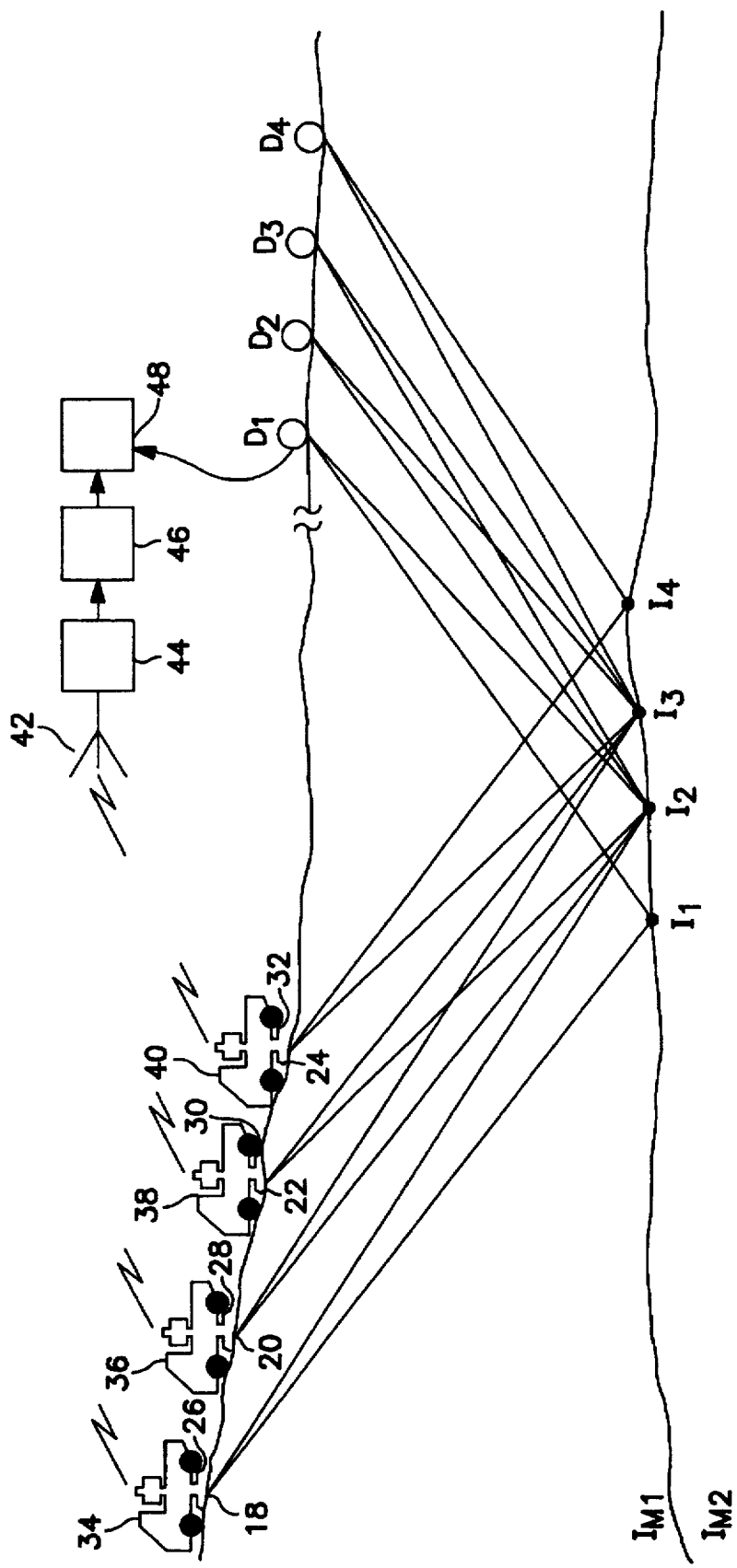
FIG. 1 is a drawing of a typical seismic data gathering technique with which the present invention may be used.

FIG. 1 is a system diagram illustrating the data gathering process of the present invention. Vibrators 18, 20, 22 and 24, each with two pairs of accelerometers 26, 28, 30 and 32 that measure the actual signal generated into the earth are located on trucks 34, 36, 38 and 40, respectively. The signals are then transmitted via radio link 42 to master vibrator memory 44 where they are checked to determine their reliability and are stored for comparison at a later time.

The signals that are generated into the earth by vibrators 18, 20, 22 and 24 are reflected off the interface between subsurface impedance $Im_1$ and $Im_2$ at various points, $I_1$, $I_2$, . . . etc. along the interface. These reflected signals are detected by geophones $D_1$, $D_2$, $D_3$ and $D_4$, respectively. The signals generated by vibrators 18, 20, 22 and 24 on trucks 34, 36, 38 and 40 are transmitted to recorder 46 for transfer to tape 48 for combination with raw seismic data received from geophones $D_1$, $D_2$, $D_3$ and $D_4$. The received data signals and the raw seismic data stored on a tape 48 can be transferred to computers at other locations.

These measured signals are minimum phase relatives of the actual signals that are generated into the earth through a vibratory source technique. In prior art applications, most processing is done with the reference sweep signal which is the signal intended to be generated into the surface of the earth. In the present invention, a signal that is a minimum phase relative of the actual force generated into the earth is measured and taken from the vibrator source directly. Thus, a signal which is mathematically related to the actual signal is used in the process instead of a theoretical signal.

Using the method of the present invention, High Fidelity Vibratory Seismic, HFVS, recording vibratory motion and processing the recorded seismic data is done in such a way that the unknown actual applied force does not need to be known. The only important factor is that the measured quantity is quantifiably related to the actual force applied. In this manner, the actual force can be eliminated by division.

In conventional processing a reference signal x is fed to an actuator which puts a signal, the true vibrator output, into the ground. As this signal, the true vibrator output, travels through the earth, it is multiplied by the impulse response of the earth in the frequency domain or convolved with the impulse response in the time domain. It is this convolution product, the time derivative of the actual signal convolved with the impulse response of the earth that is correlated with the reference sweep signal. This process is correct if and only if the reference sweep signal is equal to the true vibrator output.

The present invention takes a different approach than conventional processing. First, the method of the present invention recognizes that the motions measured on the vibrator are only related to and not equal to the actual output force or signal that is put into the ground. These are related by a minimum phase transfer function in the frequency domain. Both the minimum phase transfer function and the actual output force are unknown. The second area where the present invention takes a different approach is by performing an inversion operation instead of the correlation process of conventional processing.

By recognizing that the motions measured on the vibrator are related to the actual output force or signal put into the ground by a minimum phase transfer function in the frequency domain, the following formula where the output force signal is multiplied by a transfer function of minimum phase results:

$$\begin{pmatrix} M_{A1} & M_{B1} \\ M_{A2} & M_{B2} \end{pmatrix} = T \cdot \begin{pmatrix} G_{A1} & G_{B1} \\ G_{A2} & G_{B2} \end{pmatrix}$$

or $$M = T \cdot G$$

where:

M=the measured motion on the vibrator matrix

G=the true vibrator output matrix in the frequency domain,

T=a transfer function of a minimum phase, causal, linear system relating G with measured vibrator motion, and ·=multiplication in the frequency domain.

Matrix subscripts designate the vibrator and sweep, for example, A1 designates vibrator A, sweep 1, B1 designates vibrator B, sweep 1, etc.

In this equation both the minimum phase transfer function, T, and the actual output force, G, are unknown.

The seismic data detected by either geophones or hydrophones is represented in the frequency domain by the convolution of the time derivative of the actual force G with the reflectivity of the earth, E, as indicated by the following formula:

$$\begin{pmatrix} D_{A1} & D_{B1} \\ D_{A2} & D_{B2} \end{pmatrix} = j\omega \cdot \begin{pmatrix} G_{A1} & G_{B1} \\ G_{A2} & G_{B2} \end{pmatrix} \cdot \begin{pmatrix} E_{A1} & E_{B1} \\ E_{A2} & E_{B2} \end{pmatrix}$$

or $$D = j\omega \cdot G \cdot E$$

where:

D=the measured seismic data matrix jω=the time derivative

E=the earth reflectivity matrix

By using inverse filtering through a minimum phase band pass filter the ratio of D/M can be computed. This ratio eliminates the unknown G, the output force, from the equation as follows:

$$\frac{\begin{pmatrix} D_{A1} & D_{B1} \\ D_{A2} & D_{B2} \end{pmatrix}}{\begin{pmatrix} M_{A1} & M_{B1} \\ M_{A2} & M_{B2} \end{pmatrix}} = \frac{j\omega \cdot \begin{pmatrix} G_{A1} & G_{B1} \\ G_{A2} & G_{B2} \end{pmatrix} \cdot \begin{pmatrix} E_{A1} & E_{B1} \\ E_{A2} & E_{B2} \end{pmatrix}}{T \cdot \begin{pmatrix} G_{A1} & G_{B1} \\ G_{A2} & G_{B2} \end{pmatrix}}$$

or $$\frac{D}{M} = \frac{j\omega \cdot G \cdot E}{G \cdot T}$$

$$\frac{\begin{pmatrix} D_{A1} & D_{B1} \\ D_{A2} & D_{B2} \end{pmatrix}}{\begin{pmatrix} M_{A1} & M_{B1} \\ M_{A2} & M_{B2} \end{pmatrix}} =$$

$$\frac{j\omega}{T} \cdot \begin{pmatrix} G_{A1} & G_{B1} \\ G_{A2} & G_{B2} \end{pmatrix} \cdot \begin{pmatrix} E_{A1} & E_{B1} \\ E_{A2} & E_{B2} \end{pmatrix} \cdot \begin{pmatrix} G_{A1} & G_{B1} \\ G_{A2} & G_{B2} \end{pmatrix}^{-1}$$

or $$\frac{D}{M} = \frac{j\omega}{T} G \cdot E \cdot G^{-1}$$

Where $$\begin{pmatrix} G_{A1} & G_{B1} \\ G_{A2} & G_{B2} \end{pmatrix}^{-1} = G^{-1} = \frac{\text{Adjoint of } G}{\det G}$$

Therefore $$\frac{D}{M} = \frac{j\omega}{T} \cdot E$$

At this point, the unknown force G has been eliminated from the equation. A scaling factor is also required to preserve total energy through the inverse filtering process.

The seismogram is now represented by D/M and is the desired answer, E, the earth reflectivity, convolved with a minimum phase function $j\omega/T$. It is a property of minimum phase functions that their derivative and their reciprocal are also minimum phase. The seismogram can be further processed with minimum phase deconvolution to obtain E, the impulse response of the earth in the frequency domain. In essence the D/M seismogram is the band limited impulse seismogram. It is causal and minimum phase related to the earth response.

D/M → MINIMUM PHASE DECONVOLUTION → E

This method is always correct since the actual and unknown vibratory motion has been eliminated.

The detected seismic data is represented in the frequency domain by the product of the time derivative of the actual force and the reflectivity of the earth.

By using inverse filtering through a minimum phase band pass filter, the ratio of the measured seismic motion to the measured motion of the vibrator can be computed. This ratio eliminates the unknown actual output force. A scaling factor is required to preserve total energy through the inverse filtering process.

The resulting seismogram is represented by the ratio of the measured seismic motion to the measured motion of the vibrator and is the desired answer, the earth reflectivity, convolved with a minimum phase function. It is a property of minimum phase functions that their derivative and their reciprocal are also minimum phase. Thus, the seismogram can be further processed with minimum phase deconvolution to obtain the impulse response of the earth in the frequency domain. In essence the ratio of the measured seismic motion to the measured motion of the vibrator seismogram is the band limited impulse seismogram. It is causal and minimum phase related to the earth response. This method is always correct since the actual and unknown vibratory motion has been eliminated.

The basic process of the present invention includes receiving data, dividing the data in the frequency domain by measured signals from the seismic source generating the signal and performing minimum phase deconvolution on the result of the division.

Figure 2:
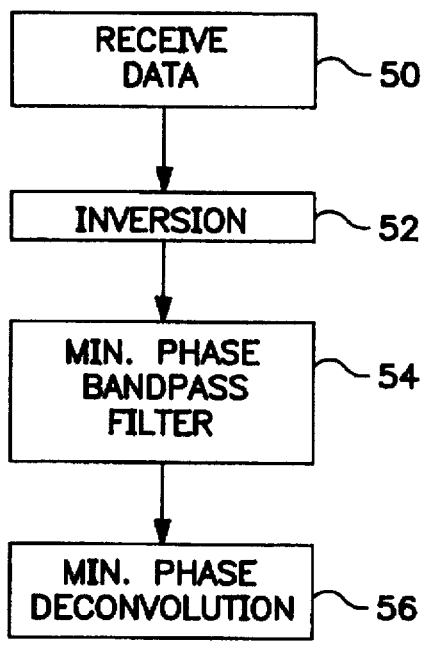
FIG. 2 is a block diagram of a flow chart illustrating a preprocessing method for data generated by multiple vibratory sources.

Referring now to FIG. 2, a flow chart of a preferred embodiment of the method of present invention is illustrated in block form. This method may be performed on any digital computer or work station currently in use in the art.

Initially, at block 50 data stored on tape 48 is received. Data received may be of any type of seismic data generated using vibroseis techniques.

At block 52, the inversion process is performed on the received data with the measured signals. This represents a significant difference between the present invention and conventional processing. In conventional processing, the received data is convolved with signals that are assumed to be generated into the earth's surface. In the present invention, an inversion process is performed with measured signals, which eliminates certain assumptions which have been described previously.

At block 54 the inverted data is passed through a minimum phase bandpass filter. At block 56 minimum phase deconvolution is performed on the data that has undergone an inversion process and been passed through a minimum phase bandpass filter. This removes the effect of the $j\omega/T$ term that has been added. Thus, by processing the seismogram with minimum phase deconvolution, the impulse response of the earth in the frequency domain is obtained.

Figure 3:
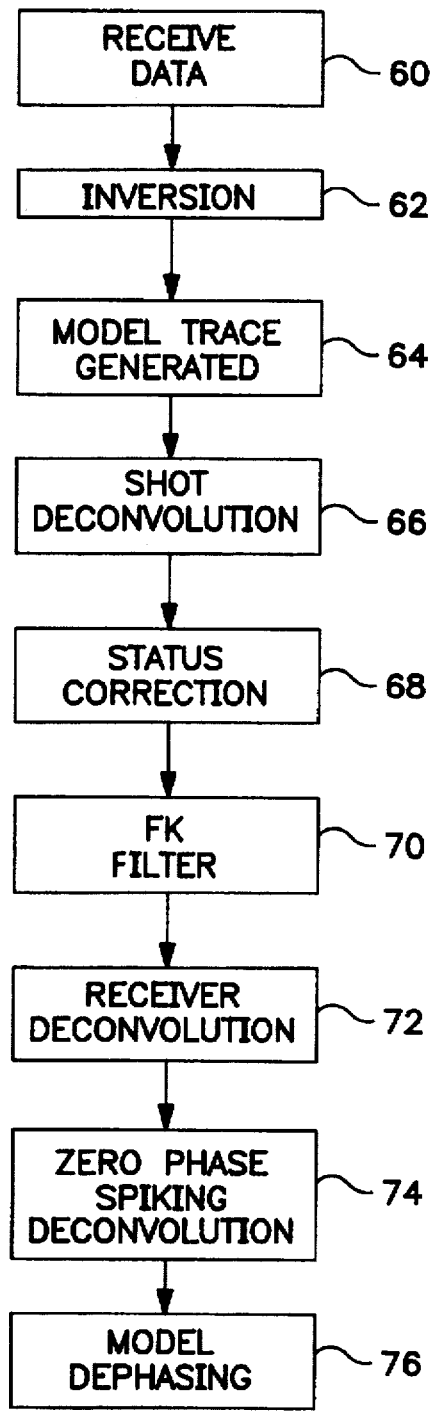
FIG. 3 is a block diagram of a flow chart illustrating a second preprocessing method for data generated by multiple vibratory sources.

In FIG. 3, a flow chart of a second embodiment of the method of present invention is illustrated in block form. This method may also be performed on any digital computer or work station currently in use in the art.

Initially, at block 60 data stored on tape 48 is received. Data received may be of any type of seismic data generated using vibroseis techniques.

At block 62, the inversion process is performed on the received data with the measured signals. This represents a significant difference between the present invention and conventional processing. In conventional processing, the received data is convolved with signals that are assumed to be generated into the earth's surface. In the present invention, an inversion process is performed with measured signals eliminating certain previously described assumptions.

At block 64 a model trace may be generated. This model trace is basically a trace with a spike to record the phase and amplitude of the original data. The model trace will be used later to remove phase errors introduced by some of the processing steps in the method of the present invention.

At block 66 processed information from block 62, the results of the inversion process, may undergo shot deconvolution. A Wiener-Levinson spiking deconvolution is preferred in the present invention, however, any deconvolution which uses a common shot gather format to remove the effects due to variations between individual shots may be used.

At block 68, source statics correction may be performed on the data. In the preferred embodiment, the same gather for statics correction and for FK filtering is used, a constant receiver location gather to remove source statics.

At block 70 FK filtering may be performed using a constant receiver location variable shot gather to remove ground roll. At block 72 receiver deconvolution is performed on the data, which is also, preferably, a Wiener-Levinson spiking ensemble deconvolution. This is a common receiver gather to remove receiver noise, however, any deconvolution that is directed to the removal of receiver noise is acceptable. At block 74 the data undergoes zero phase spiking deconvolution. This is a spectral whitening deconvolution to remove monochromatic noise.

At block 76 model dephasing may be done using the model trace which was generated at block 64 to record the original phase and amplitude. This is done to remove any phase errors introduced by the previous processing steps. At this point, the method of the present invention has completed the pre-processing and conventional processing may be performed after block 76.

Thus, the method of the present invention for recording and pre-processing high resolution vibratory source data has been described which includes the steps of division with measured signals, receiver and shot ensemble deconvolution, statics correction, F-K filtering for noise, zero phase spiking deconvolution and model dephasing. As stated previously, an actual vibrator signal related to what the vibrator is sending into the ground is used in pre-processing. The vibrator motion is measured to provide a signal that is used to process the data. The data is divided by the actual transmitted signal in the frequency domain.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A method for processing high resolution vibroseis data comprising the steps of:

receiving electrical signals representing received seismic information generated by multiple vibrators;

receiving measured signals representing transmitted seismic waves from said multiple vibrators;

performing an inversion function on said electrical signals with said measured signals to obtain inversion electrical signals; and performing minimum phase deconvolution on said inversion electrical signals.

2. The method according to claim 1 also including the steps of:

shot deconvolving said inversion electrical signals;

performing statics correction on said deconvolved inversion electrical signals;

filtering said statics corrected electrical signals;

performing receiver deconvolution on said filtered electrical signals; and performing zero phase spiking deconvolution on said receiver deconvolved signals.

3. The method according to claim 1 also including the steps of:

generating a model trace with a spike of said inverted electrical signals; and dephasing said zero phase deconvolved signals with said model trace.

4. The method according to claim 1 wherein said receiving measured signals step includes the steps of:

measuring the seismic signal actually transmitted into the earth's surface; and converting said measured seismic signals into a measured electrical signal.

5. An apparatus for recording high resolution vibratory source data comprising:

means for receiving electrical signals representing reflected seismic information;

means for receiving measured signals representing actual forces of a source of said reflected seismic information;

means for performing an inversion function on said electrical signals with said measured signals to obtain inversion electrical signals; and means for performing minimum phase deconvolution on said inversion electrical signals.

6. The apparatus according to claim 5 also including:

correction means for performing statics correction on said deconvolved inversion electrical signals;

filtering means for said statics corrected electrical signals;

summing means for said filtered statics corrected electrical signals;

recording means for said summed electrical signals; and display means for displaying said recorded summed signals.

7. The apparatus according to claim 5 wherein said means for receiving measured signals includes:

means for measuring the seismic signal actually transmitted into the earth's surface; and means for converting said measured seismic signals into a measured electrical signal.

8. A method for recording and pre-processing high fidelity vibratory seismic data signals generated by a plurality of vibratory seismic sources comprising the steps of:

measuring the motion of each of the vibratory sources which is related to the vibrator applied force times a transfer function of minimum phase, causal, linear system;

relating actual vibrator output with said measured vibrator motion;

determining a ratio by dividing the vibratory seismic data signals by said measured motion of each vibratory source to remove the unknown applied force leaving the earth reflectivity times a time derivative divided by a minimum phase function;

minimum phase band pass filtering said resulting ratio; and performing minimum phase deconvolution on said minimum phase band pass filtered ratio to remove the time derivative divided by the transfer function of minimum phase function.

9. The method according to claim 8 also including the step of:

performing shot ensemble deconvolution on said minimum phase band pass filtered ratio.

10. The method according to claim 8 also including the step of:

performing receiver ensemble deconvolution on said minimum phase band pass filtered ratio.

11. The method according to claim 8 also including the step of:

performing statics correction on said minimum phase band pass filtered ratio.

12. The method according to claim 8 also including the step of:

performing F-K filtering for noise on said minimum phase band pass filtered ratio.

13. The method according to claim 8 also including the step of:

performing zero phase spiking deconvolution on said minimum phase band pass filtered ratio.

14. The method according to claim 8 also including the steps of:

generating a model trace from said vibratory seismic data signals generated by a plurality of vibratory seismic sources; and performing model dephasing using said model trace on said minimum phase band pass filtered ratio.

* * * * *